US006973526B2

(12) United States Patent
Lee et al.

(10) Patent No.: US 6,973,526 B2
(45) Date of Patent: Dec. 6, 2005

(54) METHOD AND APPARATUS TO PERMIT EXTERNAL ACCESS TO INTERNAL CONFIGURATION REGISTERS

(75) Inventors: John P. Lee, Tempe, AZ (US); Atul Kwatra, Chandler, AZ (US); Aniruddha P. Joshi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 10/183,641

(22) Filed: Jun. 28, 2002

(65) Prior Publication Data

US 2004/0003161 A1 Jan. 1, 2004

(51) Int. Cl.[7] .............................................. G06F 13/14
(52) U.S. Cl. ...................................... 710/305; 710/107
(58) Field of Search ................................ 710/107, 305, 710/306, 313, 315, 300–304, 110

(56) References Cited

U.S. PATENT DOCUMENTS

| | | | | |
|---|---|---|---|---|
| 6,119,192 | A | * | 9/2000 | Kao et al. .................... 710/311 |
| 6,381,636 | B1 | | 4/2002 | Cromer et al. ............... 709/211 |
| 6,574,708 | B2 | * | 6/2003 | Hayter et al. ................ 711/118 |
| 6,584,533 | B1 | * | 6/2003 | Cho et al. .................... 710/303 |
| 6,763,458 | B1 | * | 7/2004 | Watanabe et al. ........... 713/100 |
| 2001/0045884 | A1 | | 11/2001 | Barrus et al. ................. 340/7.2 |
| 2002/0178320 | A1 | * | 11/2002 | Wu .............................. 710/306 |
| 2002/0194415 | A1 | * | 12/2002 | Lindsay et al. .............. 710/305 |
| 2003/0093607 | A1 | * | 5/2003 | Main et al. ................... 710/306 |

OTHER PUBLICATIONS

ANONYMOUS: *Addition of the SMBus to the PCI Connector*, Online! Oct. 5, 2000, Retrieved from the Internet: <URL:http://www.pcisig.com/specifications/conventional/conventional_pci/smb_ecn_040501.pdf>, retrieved on Sep. 10, 2003.

* cited by examiner

Primary Examiner—Rehana Perveen
Assistant Examiner—Trisha Vu
(74) Attorney, Agent, or Firm—Blakely, Sokoloff, Taylor & Zafman LLP

(57) ABSTRACT

Access to internal configuration registers on a computer system's chipset using an external micro-controller is provided. A SMB configuration read command including a register address may be received from an external micro-controller. Access to an internal bus may be requested from a bus arbiter. If internal bus access is granted, the SMB configuration read command may be forwarded to a device including the identified register address using the internal bus. In response to the SMB configuration read command, configuration register values from the device may be received. The configuration register values may be forwarded to the external micro-controller.

18 Claims, 2 Drawing Sheets

METHOD AND APPARATUS TO PERMIT EXTERNAL ACCESS TO INTERNAL CONFIGURATION REGISTERS

TECHNICAL FIELD

The present invention relates to computer systems. In particular, the present invention relates to system management with an external micro controller.

BACKGROUND OF THE INVENTION

A typical computer system consists of several basic components, including a central processor, volatile and non-volatile memory, and various peripheral devices, including graphics controller(s), mass storage devices, and input/output devices. A chipset connects these computer system components together, and manages the flow of information between them. Several different communications protocols may be used by the computer system, including, for example, Peripheral Component Interconnect (PCI), Small Computer System Interface (SCSI-2, ANSI, etc), Universal Serial Bus (USB), system management interface, etc.

Historically, computer system chipsets use a Northbridge/Southbridge architecture, in which the functionality of the chipset is apportioned between two basic chips, or components, a Northbridge chip and a Southbridge chip, connected via a hublink bus. The Northbridge chip connects the central processor to main/secondary memory, graphics controller(s), and the hublink bus, while the Southbridge chip connects all the other input/output (I/O) devices to the hublink bus. The I/O devices are indirectly connected to the central processor via various external busses and the hublink bus on the Northbridge chip.

A chipset, developed by the Intel Corporation of Santa Clara, Calif., uses an accelerated hub architecture. In this chipset, the functionality of the traditional Northbridge and Southbridge chips is divided among three basic components, the Memory Controller Hub (MCH), the I/O Controller Hub (ICH), and the Firmware Hub (FWH). These hubs are connected using a high-speed, proprietary data bus, (hub bus), rather than the PCI bus. As the name suggests, the ICH provides I/O functionality similar to that residing in the Southbridge chip, and may include modular components connected internally using a variety of internal buses. The ICH may also include various external bus interfaces, such as, for example, a PCI bus interface, or a system management bus (SMBus) interface.

PCI configuration registers in the chipset may store a variety of configuration register information for the PCI devices connected to the system. For example, PCI configuration registers may contain configuration information from each PCI card and/or device included in the system. PCI cards may include, for example, PCI LAN cards, PCI audio cards, PCI video cards, PCI SCSI cards, etc. Configuration register information contained in the configuration registers 144 may include, for example, manufacturing ID, device ID, software and/or hardware revision ID, and/or any other information related to the particular PCI card or device.

Using conventional techniques, PCI configuration registers can be read using suitable software programs running on the central processing unit. In the event, for example, the higher-level operating system freezes and/or the path from the processor to the chipset is otherwise blocked; it may not be possible to read the PCI configuration registers.

DETAILED DESCRIPTION

Embodiments of the present invention provide a chipset architecture that may enable an external micro-controller to access and/or control PCI configuration registers using a system management bus controller. The PCI configuration registers may contain device hardware/software configuration information, management information, availability information, etc. In embodiments of the present invention, the external micro-controller may operate on a secondary operating system (OS) independent from the higher level OS running on the computer system. The secondary OS may operate in the background, with or without the presence of a higher level OS running. Using the external micro-controller and a system management controller, configuration register information may be retrieved in the background independent of the central processing unit and/or the higher level OS running.

In one embodiment, a data path is provided from the external micro-controller to the configuration registers using a system management bus interface and the system management bus controller. In a further embodiment, a machine-readable medium is disclosed having a plurality of executable instruction stored thereon. The plurality of instructions includes instructions to enable the external micro-controller to access the PCI configuration registers using the system bus controller. Advantageously, the disclosed chipset architecture may offer additional system management capabilities while maximizing system availability.

Figure 1:
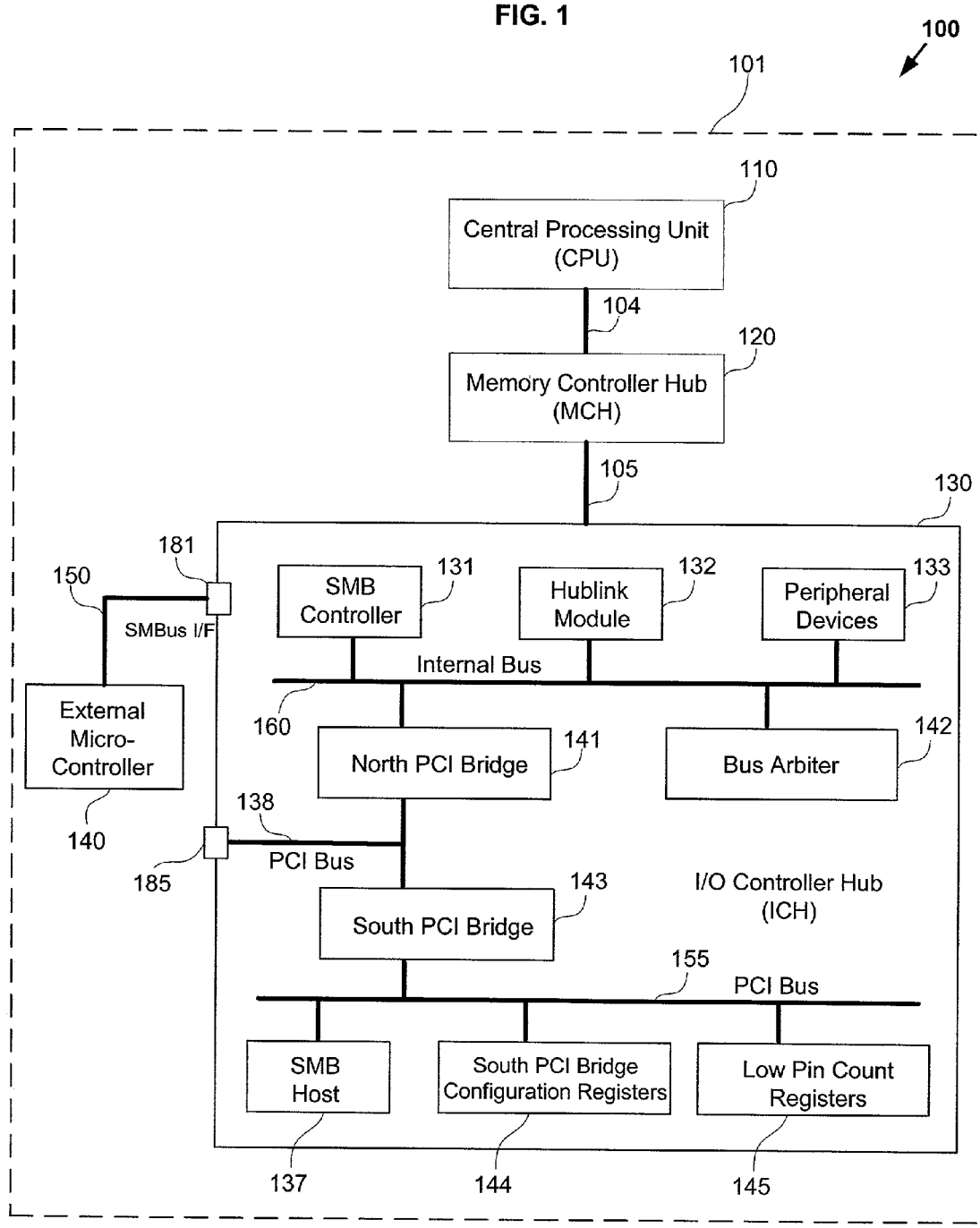
FIG. 1 is a block diagram of a partial computer network in accordance with an embodiment of the present invention.

FIG. 1 is a partial block diagram of a network 100 in which the embodiments of the present invention find application.

In embodiments of the present invention, system 100 may include additional computers, modules and/or devices that are not shown for convenience. The network 100 may be a local-area network (LAN), a wide-area network (WAN), a campus-area network (CAN), a metropolitan-area network (MAN), a home-area network, an Intranet, Internet and/or any other type of computer network. It is recognized that embodiments of the present invention can be applicable to two computers that are coupled together in, for example, a client-server relationship or any other type of architecture such as peer-to-peer network architecture. The network 100 may be configured in any known topology such as a bus, star, ring, etc. It is further recognized that network 100 may use any known protocol such as Ethernet, fast Ethernet, etc. for communications.

As shown in FIG. 1, the system 100 is a partial representation of client computer 101 that includes an external micro-controller 140 coupled to chipset 130 via a communication path, for example, a system management bus interface (e.g., SMBUS I/F) 181 using an external system management bus (SMBus) 150.

In accordance with embodiments of the present invention, additional clients 101 may be included in the network 100 coupled to a management console or computer (not shown). In this case, PCI configuration register information gathered by the micro-controller 140 for each client 101 may be shared with the management console via the network connection. This information may be centrally stored in the management console and may be used for management and/or maintenance purposes. For example, software and/or hardware revision IDs for PCI devices connected to each client 101 may be readily accessible and analyzed prior to a network and/or system upgrade to prevent any compatibility issues.

Additionally, it is recognized that the devices such as external micro-controller 140 and/or client 101 may be coupled to other clients using a wireless interface and/or a wireless communications protocol. Embodiments of the present invention may find application in a personal digital assistant (PDA), a laptop, a cell phone, and/or any other handheld and/or desktop device.

In embodiments of the present invention, client computer 101 may include a CPU 110 connected to a chipset 130 via a memory controller hub (MCH) 120. The CPU 110 may be coupled to the MCH 120 using, for example, a host bus 104 and the MCH 120 may be coupled to the chipset 130 using bus 105.

As indicated above, the micro-controller 140 may be coupled to the chipset 130 via the interface 181 using an external SMBus 150 and/or other external interface/bus combination.

The chipset 130 of computer system 101 may include, for example, a system management bus (SMB) controller 131, hublink module 132, peripheral devices 133, north PCI bridge 141, bus arbiter 142, south PCI bridge 143, south PCI bridge configuration registers (PCI registers) 144, low pin count registers (LPC) 145 and a system management bus (SMB) host 137. The system management bus (SMB) controller 131, hub-link module 132, peripheral devices 133, north PCI bridge 141 and bus arbiter 142 may all be connected to internal bus 160. The internal bus 160 may be, for example, an ISA bus, a SMBus, a PCI bus and/or any other type of bus.

In embodiments of the present invention, the PCI registers 144, LPC 145 and SMB host 137 may be coupled to the south PCI bridge 143 that is coupled to the north PCI bridge 141 via PCI bus 138. PCI Bus 138 couples south the PCI bridge 143, PCI registers 144, LPC 145 and SMB host 137 to internal bus 160. The PCI bus 138 may also provide an external connection via an external PCI interface 185.

Typically, the north PCI bridge 141 connects to main/secondary memory, graphics controller(s), and the peripheral component interconnect bus (PCI bus). The south PCI bridge 143 may connect all the other I/O devices to the PCI bus 105. The plurality of I/O devices may be indirectly connected to the CPU 110 via the PCI bus 105 and the Host-PCI bus 104 via the MCH 120. MCH 120 may interface with chipset 130 via the hub-link module 132.

In embodiments of the present invention, system 100 includes a plurality of internal and/or external communication buses that connect the various components internal to and/or external to the client 101. These busses may include, for example, host bus 104, PCI or proprietary bus 105, internal bus 160, SMBus 150, PCI bus 138, PCI bus 155 and/or other PCI buses (not shown).

In embodiments of the present invention, the external micro-controller 140 may be, for example, an 8, 16 or 32 bit microprocessor. The micro-controller 140 may be located internal or external to the motherboard, and may operate using a secondary OS independent of the higher level OS running on the computer system. Accordingly, the micro-controller 140 may operate in the background of the higher level OS. In accordance with embodiments of the present invention, the micro-controller 140 may still be operational even if the higher level OS of computer system 101 is not in operation and/or is in a fault condition. Advantageously, micro-controller 140 may access PCI configuration registers even when the computer system 101 is locked up or in a fault state.

In embodiments of the present invention, micro-controller 140 may access information contained in PCI configuration registers 144, internal registers of peripheral devices 133, and/or any other type of internal registers located in computer system 101 using SMB controller 131. For example, PCI configuration registers 144 may copy configuration information from each PCI card and/or device included in the system. PCI cards may include, for example, PCI LAN cards, PCI audio cards, PCI video cards, PCI SCSI cards, etc. Configuration information copied into the configuration registers 144 may include, for example, manufacturing ID, device ID, software and/or hardware revision ID, and/or any other information related to the particular PCI card or device.

In embodiments of the present invention, additional information copied to the configuration registers 144 may include device identification information, the amount of time the device has been operation, date, time and description of last fault, date, time and description of last repair, and/or any other information that may be needed to manage, repair, and/or replace the device to prevent system failures.

In embodiments of the present invention, the information stored in the configuration registers 144 may be used by the external micro-controller 140 for inventory management, to predict when a device may fail, to predict when the device may need to be repaired and/or replaced, etc. As indicated above, such information may be sent to a management console using a LAN where the information centrally located and used for system maintenance and/or system management purposes.

In embodiments of the invention, external micro-controller 140 may access the register configuration values using the SMB controller 131 via external system management bus 150 and SMBus interface 181. The external micro-controller 140 can periodically access the register configuration values by sending a SMB configuration read command to the SMB controller 131. The SMB configuration read command may include an address identifying the register and/or device for which internal configuration information is desired. Responsive to the SMB configuration read command, from external micro-controller 140, the SMB controller 131 may send a read request to bus arbiter 142 using internal bus 160.

In embodiments of the present invention, the bus arbiter 142 contains logic to the arbitrate between traffic or requests from, for example, the CPU 110, the external micro-controller 140 and other devices and or modules in system 100. By providing an external connection to the internal bus 160, micro-controller 140 can access the plurality of configuration registers associated with modules located on the chipset 130 and/or other devices coupled to computer system 101.

In embodiments of the present invention, the SMB controller 131 may request bus arbiter 142 for access to the internal bus 160. As indicated above, the bus arbiter 142 controls access to internal bus 160. If the internal bus 160 is being accessed by another device such as CPU 110, the bus arbiter 142 may not grant access to the SMB controller 131. When the internal bus 160 is available, management controller 131 is granted access to the bus 160. The SMB controller 131 may post the SMB configuration read command on internal bus 160. It is recognized that the SMB configuration read commands may be issued and/or processed using normal SMB protocol and may use an SMB based signal. Although SMB configuration read commands are used herein, it is recognize that these commands may be read commands, write commands and/or other type of commands.

In embodiments of the present invention, the SMB configuration read command is forwarded to the module and/or device identified by the address included in the SMB configuration read command. For example, the SMB configuration read command may be sent to PCI configuration registers 144. In embodiments of the present invention, the SMB configuration read command may request the entire contents of the configuration register and/or may request only portion of the contents of the configuration registers.

In embodiments of the present invention, the module or device identified by the address may receive the SMB configuration read command and processes the read request. The module and/or device may retrieve the requested information from the internal configuration registers and forward the contents of the configuration registers to the SMB controller 131.

In embodiments of the invention, the device may request the bus arbiter 142 for access to the internal bus 160. When the internal bus 160 access is granted, the module may post the contents of the configuration registers on internal bus 160. The requested configuration register values may be retrieved from the internal bus 160 by the SMB controller 131. The SMB controller 131 may forward the configuration values to the external micro-controller 140 via the SMB interface 181.

In embodiments of the present invention, the contents of the configuration registers may be used by the micro-controller 140 for system management purposes. For example, the micro-controller 140 may determine based on the contents of the registers, the version of software running on the device, the hardware version of the device, the amount of time the device has been operation, and/or any other information related to the device operation and/or management. Such information may be used for inventory management and/or to predict when the corresponding device and/or module may fail. In this case the device may be examined, repaired, and/or replaced prior to failure. In embodiments of the present invention, external micro-controller may be coupled to a plurality of computers 101 and may be able to quickly retrieve and/or request the contents of configuration registers associated with devices and/or modules related to the plurality of computers 101.

As indicated above, in embodiments of the present invention, micro-controller 140 may use an OS that is running independent of the OS of computer system 101. Accordingly, the external micro-controller 140 may be able to access contents of the configuration registers even when system 101 is in a fault and/or lock-up state. The external micro-controller 140 may retrieve and/or use the contents of the internal registers to diagnose, isolate and/or repair faults related to the corresponding device and/or module. Additionally, the use of the external micro-controller to access the configuration registers may free the CPU 110 from this responsibility.

In an embodiment of the present invention, the micro-controller 140 may request the contents of the configuration registers on a periodic basis, during a fault condition and/or when requested by an operator.

In embodiments of the present invention, contents of the configuration registers may be used to determine, for example, the total amount of time the associated device has been in operation. In one example, the total time of the operation time may be compared with the mean or average time before failure for the particular device. This information may be used to maintain, repair and/or replace the corresponding module and/or device. An operator may be notified if a particular device is approaching such a possible failure point.

Figure 2:
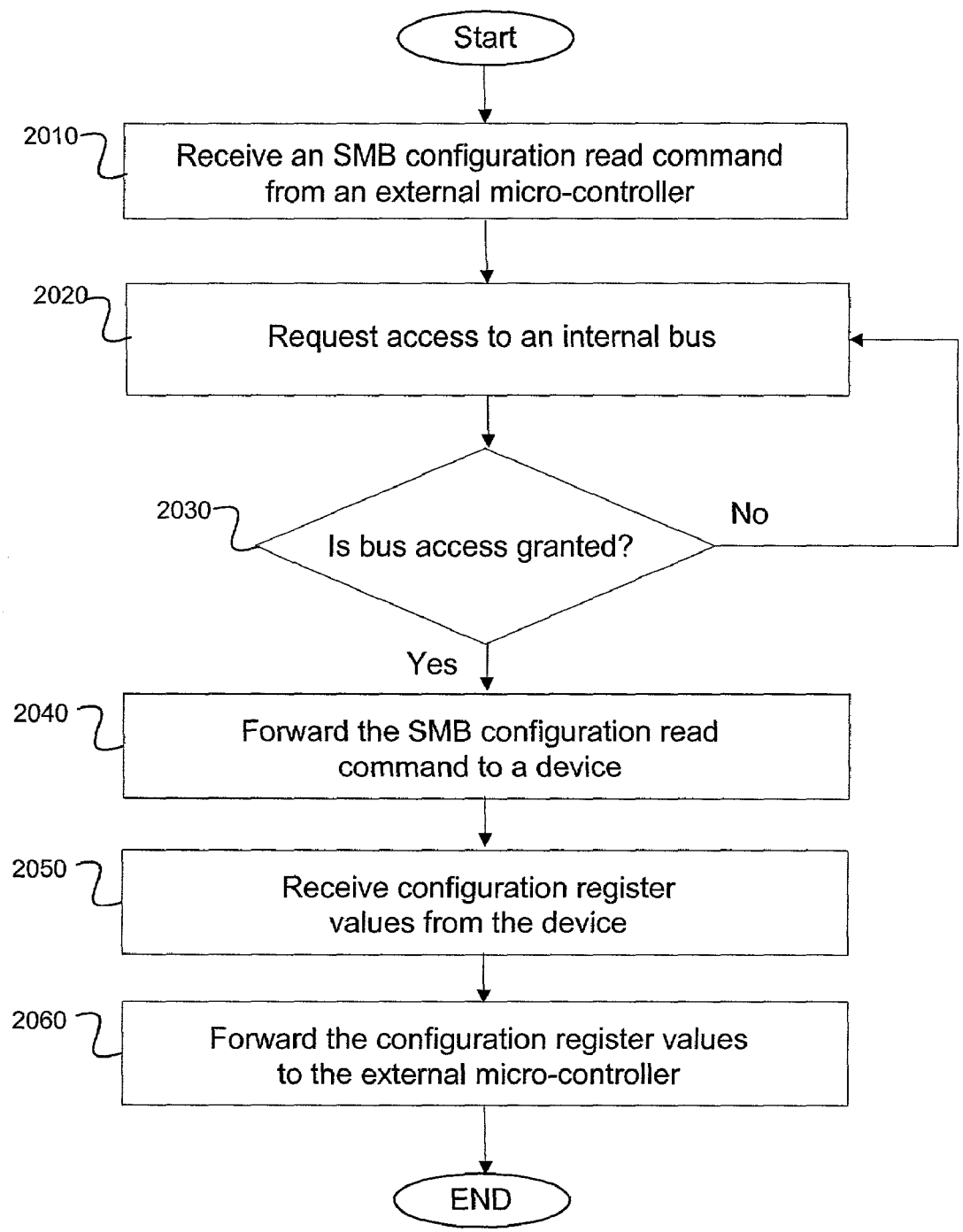
FIG. 2 is a flowchart illustrating a method in accordance with embodiments of the present invention.

FIG. 2 is a flowchart illustrating a method in accordance with an embodiment of the present invention. In one embodiment of the present invention, a SMB configuration read command including a register address is received from the external micro-controller 140, as shown in 2010. The SMB controller 131 or another device may receive the SMB configuration read command from the external micro-controller 140. As shown in 2020, access to the internal bus 160 is requested from the bus arbiter 142. Once bus access is granted, the SMB configuration read command may be sent to the peripheral device with the corresponding configuration register identified by the register address, as shown in 2030–2040.

If, on the other hand, bus access is not granted, the SMB controller 131 may continue to request bus access until granted, as shown in 2030 and 2020.

In embodiments of the present invention, the corresponding device may retrieve contents of the configuration registers and send the retrieved contents to the SMB controller 131 once access to the internal bus 160 is granted from arbiter 142. As shown in 2050–2060, the requested contents of the configuration registers may be received by the SMB controller 131 and forwarded to the external micro-controller 140.

In embodiments of the present invention, the external micro-controller 140 examines the contents of the configuration registers and may log this information. As indicated above, the external micro-controller may use the contents of the configuration registers for inventory management and recordation purposes. In addition, the external micro-controller 140 may use the contents of the configuration registers to predict when device may fail based on the time the device has been in operation. In this manner, an operator may take action before the device fails.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. An apparatus comprising:
    a computer system having;
        a chipset, coupled to the SMBus interface, having:
        PCI configuration registers; and
        a SMB controller to access the PCI configuration registers;
    a system management bus (SMBus) interface coupled to the SMB controller; and
    a microcontroller, coupled to the SMBus external to the computer system, to access the PCI configuration registers via the SMB controller, the microcontroller capable of accessing the PCI configuration registers whenever the computer system is not in operation.

2. The apparatus of claim 1, wherein responsive to the read request the SMB controller to generate an SMB configuration read request including an address for a configuration register to be read.

3. The apparatus of claim 1, wherein the chipset further comprises:
    an internal bus coupled to the SMB controller to deliver PCI configuration register values to the SMB controller in response to the read request from the external micro-controller.

4. The apparatus of claim 3, wherein the chipset further comprises:
a bus arbiter, coupled to the internal bus, to grant access to the internal bus in response to a request for internal bus access from the SMB controller.

5. The apparatus of claim 4, wherein the chipset further comprises:
a configuration register to receive a SMB configuration read request from the SMB controller and to send configuration values to the SMB controller.

6. A chipset comprising:
an external bus interface coupled to an external micro-controller using an external system management bus;
an internal bus; and
a system management bus controller coupled to the external bus interface and the internal bus, wherein responsive to a SMB configuration read command including a configuration register address from the external micro-controller, the controller to send the SMB configuration read command to a configuration register of a peripheral device identified by the configuration register address using the internal bus, and wherein the controller to receive configuration register values for the identified configuration register from the peripheral device in response to the SMB configuration read command and to forward the configuration register values to the external micro-controller, the system management bus controller capable of sending the SMB configuration read command to the configuration register whenever the chipset is not in operation.

7. The system of claim 6, further comprising:
a peripheral device to receive the SMB configuration read command, retrieve configuration register values in configuration register identified by the configuration register address, forward the configuration register values to the system management controller when the internal bus is available for access.

8. A method comprising:
receiving a SMB configuration read command including a register address at a computer system from an external micro-controller when the computer system is not in operation;
requesting access to an internal bus from a bus arbiter;
if internal bus access is granted, forwarding the SMB configuration read command to a device including register address using the internal bus;
responsive to the SMB configuration read command, receiving configuration register values from the device; and
forwarding the configuration register values to the external micro-controller.

9. The method of claim 8, further comprising:
determining by the bus arbiter whether the internal bus is available for access; and
granting access to the internal bus when the internal bus is available.

10. The method of claim 8, further comprising:
receiving a request to access the internal bus from the device by the bus arbiter;
determining when the internal bus is available for access by the device; and
granting bus access to the device when the internal bus is available.

11. The method of claim 10, further comprising:
receiving the SMB configuration read command at the device;
retrieving configuration register values from a configuration register identified by the register address; and
forwarding the configuration register values when the internal bus is available.

12. A system comprising:
a central processing unit (CPU) operating a first operating system (OS);
a chipset, coupled to the CPU, having:
PCI configuration registers; and
a SMB controller to access the PCI configuration registers responsive to receiving a read request;
a system management bus (SMBus) interface coupled to the chipset; and
a microcontroller, coupled to the SMBus interface, operating a second OS to issue the read requests to the SMB controller via the SMBus interface to receive data from the PCI configuration registers, the microcontroller capable of accessing the PCI configuration registers whenever the computer system is not in operation.

13. The system management controller of claim 12, wherein the second OS is independent of the first OS.

14. The system management controller of claim 13, wherein the microcontroller may access the PCI configuration registers if the first OS is not operating.

15. A machine-readable medium having stored thereon a plurality of executable instructions, the plurality of instructions comprising instructions to:
receive a SMB configuration read command including a configuration register address at a computer system from an external micro-controller when the computer system is not in operation;
request access to an internal bus from a bus arbiter;
forward the SMB configuration read command to a configuration register of a peripheral device identified by the configuration register address using the internal bus when bus access is granted;
responsive to the SMB configuration read command, receive configuration register values for the identified configuration register from the peripheral device; and
forward the configuration register values to the external micro-controller.

16. The machine-readable medium of claim 15 having stored thereon additional executable instructions, the additional instructions comprising instructions to:
determine by the bus arbiter whether the internal bus is available for access; and
granting access to the internal bus when the internal bus is available.

17. The machine-readable medium of claim 15 having stored thereon additional executable instructions, the additional instructions comprising instructions to:
receive a request to access the internal bus from the peripheral device by the bus arbiter;
determine when the internal bus is available for access by the peripheral device; and
grant bus access to the peripheral device when the internal bus is available.

18. The machine-readable medium of claim 17 having stored thereon additional executable instructions, the additional instructions comprising instructions to:
receive the SMB configuration read command at the peripheral device;
retrieve configuration register values in configuration register identified by the configuration register address; and
forward the configuration register values when the internal bus is available.

* * * * *